United States Patent [19]

Leder et al.

[11] Patent Number: 5,760,977
[45] Date of Patent: Jun. 2, 1998

[54] EXTERIOR REARVIEW MIRROR FOR MOTOR VEHICLES

[75] Inventors: Dietmar Leder, Barsinghausen; Jan Schubert, Wedemark, both of Germany

[73] Assignee: Bernhard Mittelhäuser, Wedemark, Germany

[21] Appl. No.: 695,362

[22] Filed: Aug. 9, 1996

[30] Foreign Application Priority Data

Aug. 11, 1995 [DE] Germany .............. 195 29 532.3

[51] Int. Cl.⁶ .................................................. B60R 1/08
[52] U.S. Cl. ........................ 359/841; 359/872; 248/479
[58] Field of Search ........................ 359/838, 841, 359/871, 872, 875, 882, 876, 877; 248/479, 481, 483, 484

[56] References Cited

U.S. PATENT DOCUMENTS

| | | | |
|---|---|---|---|
| 4,969,727 | 11/1990 | Harloff, et al. | 359/877 |
| 5,061,056 | 10/1991 | You | 359/841 |
| 5,091,804 | 2/1992 | Seitz | 359/841 |
| 5,477,391 | 12/1995 | Boddy | 359/841 |

FOREIGN PATENT DOCUMENTS 4017028  11/1991  Germany ................. 359/841

*Primary Examiner*—Paul M. Dzierzynski
*Assistant Examiner*—John Juba, Jr.
*Attorney, Agent, or Firm*—Robert W. Becker & Associates

[57] ABSTRACT

An exterior rearview mirror for a motor vehicle has a base for connecting the rearview to the vehicle. A pivot axle is positioned in the base so as to extend vertically or at an acute angle to the vertical. A housing is connected to the base so as to be pivotable about the pivot axle for allowing a forced folding of the rearview mirror in a folding direction from a rest position into a folded position. The housing has an opening for receiving an adjustable mirror pane. A lever with a first and a second end is connected with the first end to the pivot axle. The lever extends in the longitudinal direction of the vehicle or at an acute angle to this direction. The housing has a housing section facing the base. The lever penetrates the housing section and extends into the interior of the housing. A spring rests at the second end of the lever for forcing the housing against the base.

18 Claims, 2 Drawing Sheets

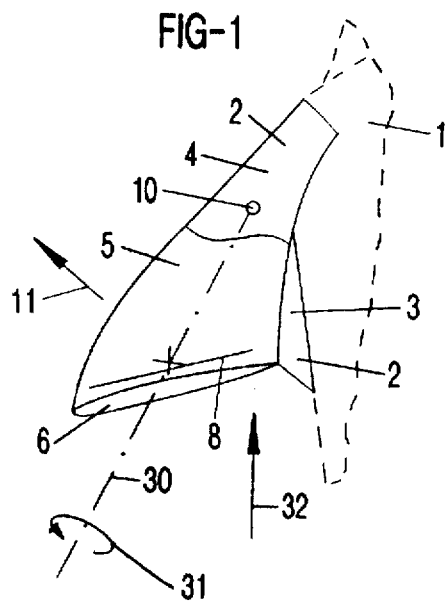
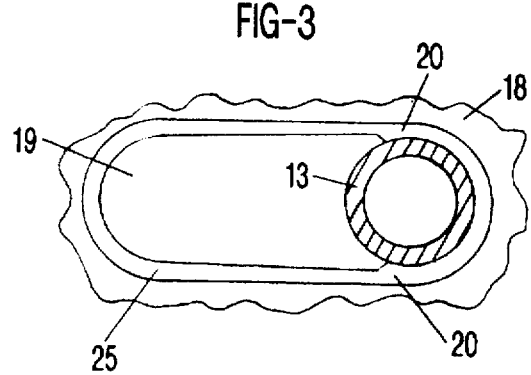
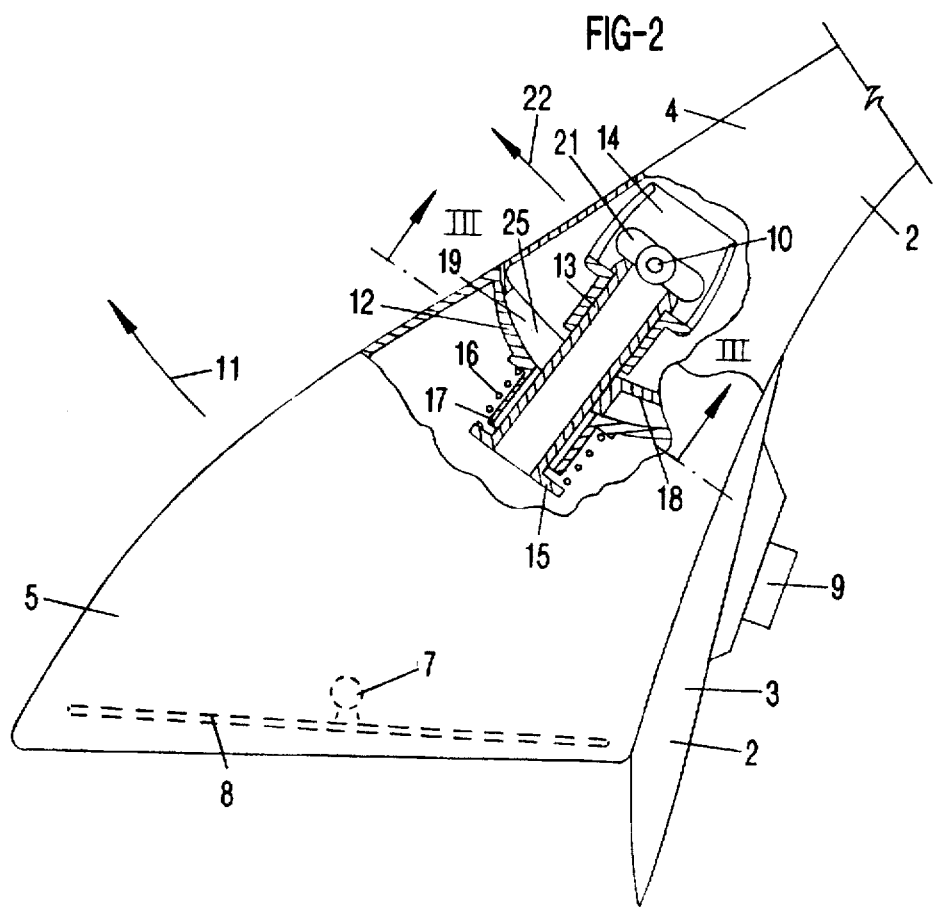

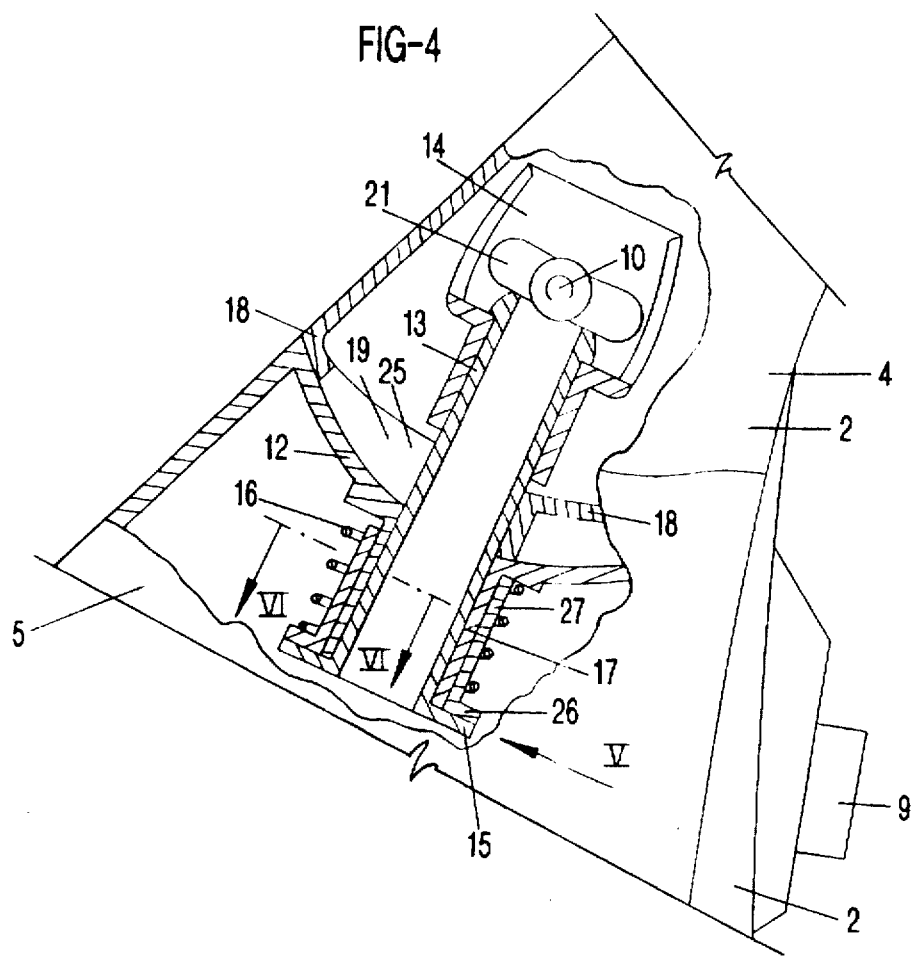
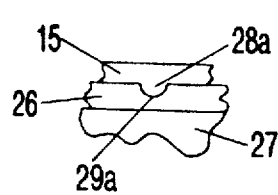
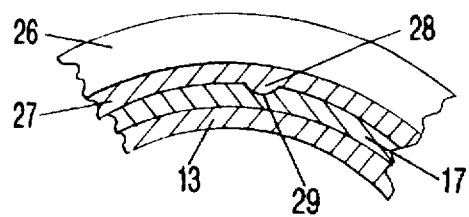

EXTERIOR REARVIEW MIRROR FOR MOTOR VEHICLES

BACKGROUND OF THE INVENTION

The present invention relates to an exterior rearview mirror extending from the side of a motor vehicle and comprising a base connected to the motor vehicle and a housing having a rearward open end for receiving an adjustable mirror pane. The housing is pivotable by external forces into a folded position about a vertical axis, or an axis slantedly extending to the vertical, relative to the base.

Such a folding action in order to yield to obstacles has the advantage that the projecting mirror, respectively, an obstacle projecting into its path, is protected when the vehicle, especially when backing out, hits an obstacle, for example, another vehicle or a door frame. Under these conditions the housing yields by pivoting (folding).

In known mirrors of this kind the housing is of a flat (rectangular) design. It projects to the side of the vehicle like ears. In this case, the housing is directly supported on a vertical axis so as to be pivotable. Such a support, however, is not possible for exterior rearview mirrors that are streamlined and have a substantially continuous transition (without steps) into the vehicle.

It is therefore an object of the present invention to embody a rearview mirror of the aforementioned kind such that a forced folding action is possible for streamlined exterior rearview mirrors.

SUMMARY OF THE INVENTION

An exterior rearview mirror for a motor vehicle according to the present invention is primarily characterized by:

A base for connecting the rearview mirror to the vehicle;

A pivot axle positioned in the base so as to extend at an acute angle, including an angle of 0°, to a vertical axis of the base;

A housing connected to the base so as to be pivotable about the pivot axle for allowing a forced folding of the rearview mirror in a folding direction from a rest position into a folded position;

The housing having an opening for receiving an adjustable mirror pane;

A lever having a first and a second end, the first end connected to the pivot axle, wherein the lever extends at an acute angle, including an angle of 0° in a longitudinal direction of the vehicle;

The housing comprising a housing section facing the base;

The lever penetrating the housing section and extending into the interior of the housing;

A spring resting at the second end of the lever for forcing the housing against the base.

Preferably, the spring is a pressure spring.

The base preferably comprises a slotted hole and the lever is arranged and guided in the slotted hole.

Advantageously, the slotted hole has a constricted area for securing the lever within the slotted hole, wherein the constricted area is elastically deformable for releasing the lever.

Preferably, the constricted area comprises two oppositely arranged elements projecting inwardly into the slotted hole.

Preferably, the lever is hollow and tubular for receiving operating elements and supply lines for adjusting the mirror pane.

In a preferred embodiment of the present invention, the first end of the lever is displaceable relative to the pivot axle from a base position into a displaced position in a direction counter to the folding direction.

Expediently, the housing has a first contact surface and the base has a second contact surface and the first and second contact surfaces contact one another. They are shaped such that under the force of the spring the first end of the lever is returned from the displaced position into the base position when the housing is returned from the folded position into the rest position.

The first end comprises a guide slot having a width identical to the width of the pivot axle.

Advantageously, the guide slot is curved such that under the force of the spring the first end of the lever is returned from the displaced position into the base position when the housing is returned from the folded position into the rest position.

Expediently, the housing section has a first contact surface and the base has a second contact surface and the first and second contact surfaces contact one another. They are shaped so as to allow the return of the first end of the lever under the force of the spring from the displaced position into the base position when the housing is returned from the folded position into the rest position.

Advantageously, the rearview mirror further comprises a bushing fixedly connected to the housing and enclosing the lever. The spring acts on the bushing, and the bushing and the lever comprise a releaseable catch connection for connecting the bushing and the lever to one another.

The lever preferably has a collar and the bushing is connected to the collar.

Advantageously, the housing section has a tubular projection and the bushing is fixedly connected to the tubular projection.

In another embodiment of the present invention, the first and second contact surfaces are at least partially spherical so as to form a ball-and-socket joint.

Expediently, the lever has a longitudinal axis and the housing is mounted on the lever so as to be pivotable to a limited extent about the longitudinal axis of the lever.

Preferably, the second end of the lever has a collar and the spring acts on the collar.

Advantageously, the rearview mirror comprises a first catch connection for securing the housing in the rest position and a second catch connection for securing the housing in the folded position.

According to the present invention, the housing is supported on a lever which extends substantially in the longitudinal direction of the motor vehicle or at a slant thereto, wherein the end of the lever facing away from the mirror pane is pivotably arranged at an axle which extends preferably vertical or at a slant to the vertical and whereby the other end of the lever penetrates a housing section and serves as an abutment for a pressure spring which forces the housing against the base whereby the housing section facing the base and the corresponding surface of the base facing the housing section are curved or shaped such that a lateral pivoting of the housing, i.e., the desired forced folding of the housing, is possible with the aid of the lever.

At the location where the lever penetrates the base, a slotted hole is provided the length of which determines the pivot path during the folding of the mirror. The slotted hole is provided with a constricted area at one end which, in the base position of the lever, secures the lever therein. By elastic deformation of the material, the lever can be released from the constricted area when the housing is forced from the rest position into the folded position.

It is especially advantageous when the pivoting connection of the lever at the base of the mirror is not designed such that it is essentially without play, but designed such that the end of the lever connected to the vertical axle is arranged such that it can be displaced to a limited extent in the pivot direction. This, for example, can be achieved by a guide slot in which a bearing bolt (vertical axle) is provided that is connected to the housing. When a forced folding takes place, the end of the lever is thus displaced by the length of the guide slot. This increases the pivoting path of the housing considerably. When the housing is then returned into the rest position, the lever is again returned into its base position. This base position is reached with the aid of the aforementioned pressure spring which, due to the previously mentioned curved surfaces between the housing and the base, always attempts to reach the base position of the end of the lever connected to the vertical axle.

The aforementioned connection of the lever and thus of the housing has furthermore the advantage that the lever can also serve as a pivot axis for pivoting the housing about the longitudinal axis of the lever in order to be able to pivot the housing, preferably in a downward direction, into a parking position in which the lateral extension of the housing is considerably reduced in order to save space. For this purpose, between the housing and the fixedly supported lever catch connections, for example, in the form of grooves and tongues are provided whereby the tongues are lifted counter to the action of the pressure spring from the grooves and the parking position can thus be reached by pivoting the housing.

BRIEF DESCRIPTION OF THE DRAWINGS

The object and advantages of the present invention will appear more clearly from the following specification in conjunction with the accompanying drawings, in which:

FIG. 1 is a plan view of an exterior rearview mirror connected to a motor vehicle;

FIG. 2 is a plan view, partly in section, of the mirror according to FIG. 1;

FIG. 3 shows a section along the line III—III of FIG. 2;

FIG. 4 shows another embodiment of an exterior rearview mirror of the present invention in a part-sectional plan view;

FIG. 5 shows a detail of the mirror according to FIG. 4 viewed in the direction of arrow V; and FIG. 6 shows a section along the line VI—VI of FIG. 4.

DESCRIPTION OF PREFERRED EMBODIMENTS

The present invention will now be described in detail with the aid of several specific embodiments utilizing FIGS. 1 through 6.

The inventive exterior rearview mirror is comprised substantially of a base 2 connected to the vehicle 1 and having a cover at 3 and 4. The mirror further comprises a funnel-shaped housing with an adjustable mirror pane 8 connected to a ball joint 7 and positioned in the rearwardly facing opening 6. This mirror pane faces the driver or the passenger of the vehicle. At the side of the base 2 facing the vehicle, a plug-in 9 for electrical connections of the mirror is provided and optionally also a support for control levers.

In order to allow a forced folding of the housing 5 with the mirror pane 8 about an axle 10 which is positioned slightly at an angle to the vertical in the direction of arrow 11, the housing 5 is supported via its curved bottom 12, projecting toward the mirror pane 8, at a lever 13 which is tubular in order to accommodate operating elements and/or supply lines for adjusting the mirror pane 8. The lever 13, at the end facing the axle 10, is fixedly connected to a flat end piece 14 which extends perpendicular to the axle 10. The free end of the lever 13 has a projecting collar 15 as an abutment for a pressure spring 16 surrounding the lever 13 concentrically. The lever 13 is also surrounded by a tubular projection 17 of the bottom (housing section) 12. The prestressed pressure spring 16 forces the bottom 12 against the base 2, respectively, against the portion of the base 2 positioned under the cover 4.

The part 18 of the base 2 facing the bottom (housing section) 12 is provided with a slotted hole 19 extending substantially transverse to the lever 13 and having a width corresponding substantially to the outer diameter of the lever 13. The length of the slotted hole 19 determines the pivot stroke of the housing 5. In order to maintain the lever 13 and thus the housing 5 in the rest position of FIG. 1, the lever 13 is secured within the slotted hole 19 by oppositely arranged projections 20 that form a constricted area.

When the housing 5 is subjected to a certain force to perform the forced folding, the constricted area within the slotted hole 19 is overcome by elastic deformation of the projections 20 so that the predetermined forced folding can occur whereby also the frictional forces are overcome which are caused by the pressure spring 16, respectively, the press-fit between the bottom 12 and the part 18. At a later point, the housing 5 can be returned into the position represented in the drawing FIG. 1, respectively, FIG. 3.

Of special importance is the design of the flat end piece 14. It does not have a certain bearing position in which the axle 10 is tightly enclosed, but has a slightly curved guide slot 21 the width of which corresponds to the diameter of the axle (bearing bolt) 10. This guide slot 21 extends practically parallel to the pivot direction (indicated by arrows 11 and 12) of the housing 5. When the housing 5 is pivoted, the end of the lever 13 connected to the axle 10 moves counter to the direction of arrow 22 to the end of the guide slot 21. Accordingly, the stroke of the folding action is substantially increased. It should be mentioned that the part of the guide slot 21 (shown to the right of the axle 10 in FIG. 2) is provided for manufacturing purposes in order to be able to use the inventive mirror with its lever design for a driver side mirror as well as a passenger side mirror. It should also be mentioned that with the return of the housing 5 into the rest position according to FIGS. 1 and 2, the curvature of the housing section 12 and the part 18 and also the slightly curved design of the guide slot 21 returns the lever 13 into the base position according to FIG. 2 especially since the pressure spring 16 also acts in the direction of return.

According to FIGS. 2 and 3, the slotted hole 19 is surrounded by a collar 25 which faces the bottom 12 and serves as an abutment for the bottom 12 so that accordingly, with respect to the axle 10, it is curved and loses height in the lateral direction.

The embodiment according to FIGS. 4 to 6 is of special importance because a folding of the housing 5 about the longitudinal axis of the hollow cylindrical lever 13 in the downward direction is possible in order to thus reach a parking position which reduces the lateral extension of the mirror at the vehicle. In order to achieve this, the pressure spring 16 does not act directly on the collar 15, but on an angled portion 26 resting at the collar 15. The angled portion 26 is provided at a bushing 27 resting on the projection 17. The bushing 27 is secured against rotation relative to the projection 17 by a tongue-and-groove connection 28/29. Preferably, a projection (tongue) 28a engages a groove 29a of the angled portion 26, the projection 28a being provided at the collar 15.

Since the angled portion 26 is spring-biased and since the bushing 27 is fixedly connected to the housing 5, the housing 5, when overcoming the spring force and the positive locking action (at 28a, 29a) can be pivoted relative to the base 2 about the longitudinal axis 30 in the direction of arrow 31 whereby the pivot path for achieving the parking position can be predetermined by a preset grooves 29a at the circumference of the collar 15. The displacement of the grooves 29a can be selected such that the pivot movement in the downward direction about the axis 30 is possible for a range of approximately 30° to 70° whereby the pivot axis 30, respectively, the longitudinal axis of the lever 13 in a plan view is displaced relative to the longitudinal direction 32, respectively, the direction of travel of the motor vehicle by about 5° to 30°. Furthermore, the axis 30 can also be positioned at a slant in the downward direction by approximately 5° to 20°.

The embodiment according to FIGS. 4 to 6 thus allows for a folding as well as for pivoting into a parking position for reducing the amount of space required by the mirror in the lateral direction. It is understood that the contact surfaces of the bottom 12 and of the base 2 in this embodiment must be spherical in order to allow for two pivoting directions.

The present invention is, of course, in no way restricted to the specific disclosure of the specification and drawings, but also encompasses any modifications within the scope of the appended claims.

What we claim is:

1. An exterior rearview mirror for a motor vehicle, said rearview mirror comprising:

a base for connecting said rearview mirror to the vehicle;

a pivot axle positioned in said base so as to extend at an acute angle, including an angle of 0° with respect to a vertical axis of said base;

a housing connected to said base so as to be pivotable about said pivot axle for allowing a forced folding of said rearview mirror in a folding direction from a rest position into a folded position;

said housing having an opening for receiving an adjustable mirror pane;

a lever having a first and a second end, said first end connected to said pivot axle, wherein said lever extends at an acute angle, including an angle of 0° with respect to a longitudinal direction of the vehicle;

said housing comprising a housing section facing said base;

said lever penetrating said housing section and extending into the interior of said housing;

a spring resting at said second end of said lever for forcing said housing against said base.

2. A rearview mirror according to claim 1, wherein said spring is a pressure spring.

3. A rearview mirror according to claim 1, wherein said base comprises a slotted hole and said lever is arranged and guided in said slotted hole.

4. A rearview mirror according to claim 3, wherein said slotted hole has a constricted area for securing said lever within said slotted hole, said constricted area being elastically deformable for releasing said lever.

5. A rearview mirror according to claim 4, wherein said constricted area comprises two oppositely arranged elements projecting inwardly into said slotted hole.

6. A rearview mirror according to claim 1, wherein said lever is hollow and tubular for receiving operating elements and supply lines for adjusting said mirror pane.

7. A rearview mirror according to claim 1, wherein said first end of said lever is displaceable relative to said pivot axle from a base position into a displaced position in a direction counter to said folding direction.

8. A rearview mirror according to claim 7, wherein said housing has a first contact surface and said base has a second contact surface and wherein said first and second contact surfaces contact one another and are shaped such that under the force of said spring said first end of said lever is returned from said displaced position into said base position when said housing is returned from said folded position into said rest position.

9. A rearview mirror according to claim 7, wherein said first end comprises a guide slot having a width identical to a width of said pivot axle.

10. A rearview mirror according to claim 9, wherein said guide slot is curved such that under the force of said spring said first end of said lever is returned from said displaced position into said base position when said housing is returned from said folded position into said rest position.

11. A rearview mirror according to claim 10, wherein said housing section has a first contact surface and said base has a second contact surface and wherein said first and second contact surfaces contact one another and are shaped so as to allow the return of said first end of said lever under the force of said spring from said displaced position into said base position when said housing is returned from said folded position into said rest position.

12. A rearview mirror according to claim 11, further comprising a bushing fixedly connected to said housing and enclosing said lever, wherein said spring acts on said bushing, wherein said bushing and said lever comprise a releasable catch connection for connecting said bushing and said lever to one another.

13. A rearview mirror according to claim 12, wherein said lever has a collar and wherein said bushing is connected to said collar.

14. A rearview mirror according to claim 12, wherein said housing section has a tubular projection and wherein said bushing is fixedly connected to said tubular projection.

15. A rearview mirror according to claim 11, wherein said first and second contact surfaces are at least partially spherical so as to form a ball-and-socket joint.

16. A rearview mirror according to claim 1, wherein said lever has a longitudinal axis and wherein said housing is mounted on said lever so as to be pivotable to a limited extent about said longitudinal axis of said lever.

17. A rearview mirror according to claim 1, wherein said second end of said lever has a collar and wherein said spring acts on said collar.

18. A rearview mirror according to claim 1, comprising a first catch connection for securing said housing in said rest position and a second catch connection for securing said housing in said folded position.

* * * * *